United States Patent
Ketcham

(10) Patent No.: US 6,771,881 B1
(45) Date of Patent: Aug. 3, 2004

(54) METHOD FOR MAINTAINING EDIT DECISION LISTS FOR DIGITAL AUDIO/ VIDEO REPRODUCERS TO MAINTAIN SYNCHRONIZATION ACROSS TIMECODE EDITS

(76) Inventor: James S. Ketcham, 26624 Ocean View Dr., Malibu, CA (US) 90265

( * ) Notice: Subject to any disclaimer, the term of this patent is extended or adjusted under 35 U.S.C. 154(b) by 910 days.

(21) Appl. No.: 09/666,124

(22) Filed: Sep. 20, 2000

(51) Int. Cl.[7] ............................. G11B 27/00; H04N 5/93
(52) U.S. Cl. ....................................... 386/55; 386/52
(58) Field of Search ............................... 386/52, 55, 57, 386/59, 60, 62, 61, 46, 1, 4, 58, 65; 360/13; 345/723; 358/452; G11B 27/00; H04N 5/93

(56) References Cited

U.S. PATENT DOCUMENTS

| 5,181,111 | A | * | 1/1993 | Hedley et al. ............... 348/452 |
| 5,386,255 | A | | 1/1995 | Beard et al. |
| 5,450,146 | A | | 9/1995 | Chedeville et al. |
| 5,751,398 | A | | 5/1998 | Beard |
| 5,774,435 | A | * | 6/1998 | Hirano ..................... 369/47.22 |
| 6,026,434 | A | | 2/2000 | Kubota et al. |

* cited by examiner

Primary Examiner—Robert Chevalier
(74) Attorney, Agent, or Firm—Kelly Lowry & Kelley, LLP

(57) ABSTRACT

A system is provided for maintaining an edit decision list for an audio/video reproducer so as to maintain synchronization across discontinuous position references, such as timecode. Discontinuities are detected, measured and the edit decision list maintained with one pass in real time. The system may be implemented into separate nodes of an asynchronous network. The system generally operates by first receiving a timecode. A discontinuity is detected within the timecode and the edit decision list is searched for a corresponding timecode discontinuity. If a corresponding timecode discontinuity is not found in the edit decision list, the edit decision list is maintained by creating and adding a timecode corresponding to the detected timecode discontinuity. Dropouts and errors in the timecode are detected and corrected and a sequential timecode is generated. A selected segment of digital audio/video is opened using the sequential timecode and a continuous audio/video stream is created from the maintained edit decision list.

22 Claims, 4 Drawing Sheets

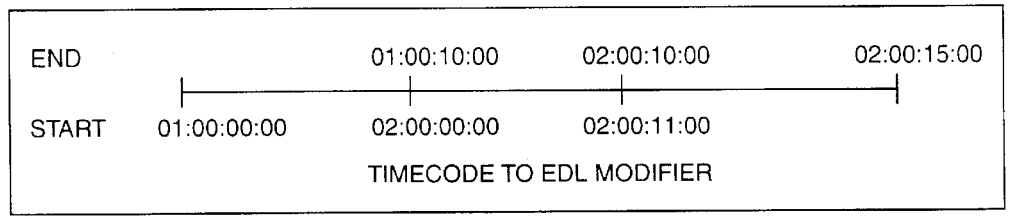
FIG. 3
FIG. 4
EDIT DECISION LIST
| START | DURATION |
|---|---|
| 01:00:00:00 | 00:00:10:00 |
| 02:00:00:00 | 00:00:10:00 |
| 02:00:11:00 | 00:00:04:00 |
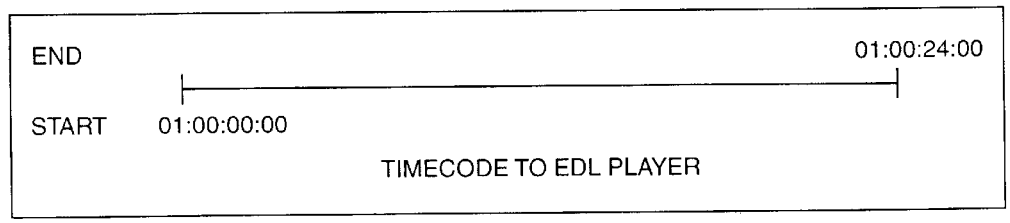
FIG. 5

METHOD FOR MAINTAINING EDIT DECISION LISTS FOR DIGITAL AUDIO/ VIDEO REPRODUCERS TO MAINTAIN SYNCHRONIZATION ACROSS TIMECODE EDITS

BACKGROUND OF THE INVENTION

This invention relates to digital audio/visual reproducers or EDL players. More particularly, the present invention relates to a method for maintaining edit decision lists of digital audio/video reproducers to maintain synchronization across timecode edits.

Picture and sound editorial work for movies and television is currently done, for the most part, on digital workstations. These workstations may use a "flat file" format in which all of the elements are grouped into a single and relatively long file. When sound editorial work is done on physical media, such as film, the sounds are cut with blank film, called leader, between film. The result is equivalent to a flat file. Modifying the sound track requires splicing the film. This is often called destructive editing.

Another workstation format is known as "edit decision list" (EDL) using an EDL digital audio reproducer (EDL player). In the EDL format, a small file of text information references a number of elements in individual audio files by the elapsed time. The entries in the EDL describe the attributes of each edit and the file name of the new clip. The digital audio/video reproducers that use EDL's reproduce audio/video locked to a continuous stream of timecode imprinted on the film by playing segments of audio/video in a seamless sequence. The length and location of these segments is determined by entries in the EDL. The method of joining the segments may be either a programmed cross-fade or a hard splice. Typically, in audio editing, the entries are cross-faded to avoid audible pops and clicks caused by sudden steps at edits.

Once the editorial work is done, the results may then be stored in a flat file. This may be done directly for video or sound. In the case of film editorial done on AVID or similar systems, a negative cutting list is generated. The film negative is cut to match the EDL. In a typical EDL player, sounds are buffered for some time in advance, perhaps several seconds. When a segue from one sound clip to another is done, a cross-fade is computed and the incoming cross-faded sound clip is appended to a buffer in the EDL player.

EDL's are known as a non-destructive editing format. By manipulating a list, two distinct advantages are gained over the flat file format. First, changing reference files allows quick and easy editing. Second, by not copying files to perform edits, time and storage space are saved.

Position information and rate information are required to play back digital audio in synchronization with the video. Once the position in the EDL is established, the EDL player opens the appropriate sound clip on the appropriate sample. The rate information determines the rate at which samples are drawn from the file, Thus, EDL's allow large amounts of data to be manipulated by modifying only a small list, saving time and storage space during editorial work However, implicit in the design of an EDL player is that the position information, i.e. timecode, will be sequential. Behavior at timecode discontinuities is unpredictable. Discontinuities in position are dealt with in an unspecified manner, for example, a likely result of timecode position discontinuity could be a momentary mute of indeterminate length while the current clip or file was closed and the appropriate clip was opened.

Thus, although EDL player's present several advantages, position information such as timecode must be continuous for their proper operation. Digital audio/video reproducers that use EDL's are therefore not appropriate for use in applications where timecode is discontinuous. Subsequent splicing or other damage to the film can disrupt the continuity of the positional timecode and cause the momentary mutes described. One such instance is theatrical exhibition of timecoded films having trailers and splices.

Systems have been devised to address this and similar problems. For example, one method of playing back audio to discontinuous timecode essentially uses the timecode itself as the EDL. When a discontinuity is detected, audio from the new file is appended to the buffer according to the new timecode. Although this method is simple, the edits are not cross-faded. In the case of APT compressed digital audio data, such as the DTS digital theater system, an unintentional cross-fade occurs because of the nature of the compressor. If this method were used with uncompressed digital audio data it would click and pop at edits. Another system requires a pass of the timecode to record an edit. A second pass is required for the next edit. Thus, real time continuous edits are not achieved.

Accordingly, there is a need for a method of maintaining edit decision lists for EDL players to maintain synchronization across timecode edits. The present invention fulfills this need and provides other related advantages.

SUMMARY OF THE INVENTION

The present invention resides in a system and method of generating continuous position reference, i.e. timecode, locked to an incoming discontinuous position reference for input into an EDL player (audio/video reproducer). The edit decision list of the EDL player is maintained in real time so that the audio or video output corresponds to the discontinuous incoming timecode.

The system for maintaining the edit decision list for the EDL player includes receipt of a potentially discontinuous position reference, an edit decision list driven audio/video player, means for measuring position reference discontinuities, such as an edit identifier, means for generating a continuous position reference to drive the edit decision list driven audio/video player, such as a timecode generator, and means for using the measurements to maintain the edit decision list, such as an edit decision list modifying program. The system of the invention ensures that the audio/video output from the player maintains proper synchronization and proper transitions between discontinuities. The discontinuities are detected, measured and the edit decision list maintained with one pass in real time. The system may be implemented into separate nodes of an asynchronous network.

The system generally operates by first receiving a timecode. A discontinuity is detected within the timecode and the edit decision list is searched for a corresponding timecode discontinuity. If a corresponding timecode discontinuity is not found in the edit decision list, the edit decision list is maintained by creating and adding a timecode corresponding to the detected timecode discontinuity. The initial position in the edit decision list is located using the received timecode. The discontinuity is searched for by comparing the edit decision list to the time discontinuity. Dropouts and errors in the timecode are detected and corrected and a sequential timecode is generated which incorporates the corrected dropouts, errors and created corresponding time discontinuity timecode. A selected segment of digital audio/ video is opened using the sequential timecode and a continuous audio/video stream is created from the maintained edit decision list.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 3 is a representation of discontinuous timecode received by the EDL modifier of FIG. 2;

FIG. 4 is a representation of the EDL list that would be generated on the first pass reading of the discontinuous timecode by the invention;

FIG. 5 is a representation of the continuous timecode generated by the EDL modifier and which is sent to the EDL player.

DETAILED DESCRIPTION OF THE PREFERRED EMBODIMENTS

Figure 1:
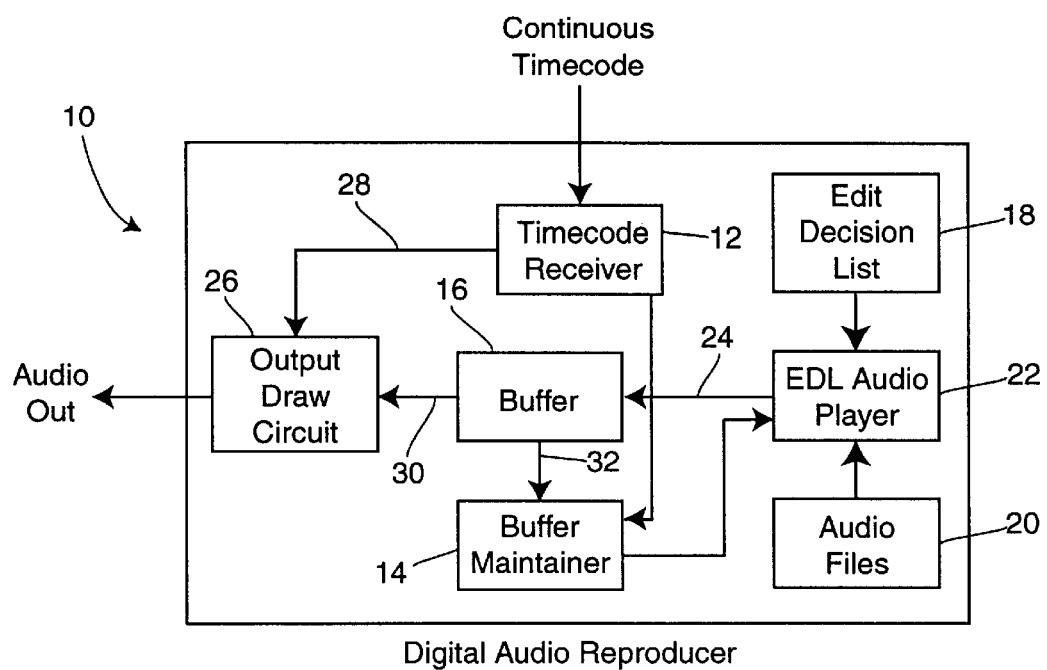
FIG. 1 is a functional block diagram illustrating various components of an existing digital audio reproducer or EDL player.

As shown in the drawings for purposes of illustration, the present invention is concerned with the creation of an EDL list from discontinuous timecode. The invention creates a new discontinuity entry in the EDL and outputs sequential position information to the EDL player so that audio plays uninterrupted.

With reference to FIG. 1, an exemplary prior art EDL player 10, or digital audio reproducer, is shown. Such EDL players are commercially available, such as the ED-1 EDL Lister from CB Electronics of Colin Broad, United Kingdom. In normal operation, timecode receiver 12 receives continuous timecode from a source, such as the film media. When the timecode is first received, buffer maintainer 14 requests corresponding edit decision list data and sequential timestamps to be delivered to buffer 16. The requests are a linear index into the edit decision list 18. The edit decision list 18 indexes data from the EDL audio files 20 which is timestamped and sent to the buffer 16 via the EDL audio player 22 in the form of asynchronous data 24. The data and timestamps are aligned to timecode receiver 12. Output draw circuit 26 is started and obtains output data clock 28 from timecode receiver 12 which derives the output data clock 28 from the rate of the incoming timecode. Synchronous EDL player data 30 is drawn from buffer 16 by output draw circuit 26. Timestamp on data from buffer 32 is compared to timecode receiver data in order to start play of EDL data when buffers are initialized, or to stop playing EDL data when a discontinuity is found. As described above, such a discontinuity can cause pauses or pops in the audio output.

Figure 2:
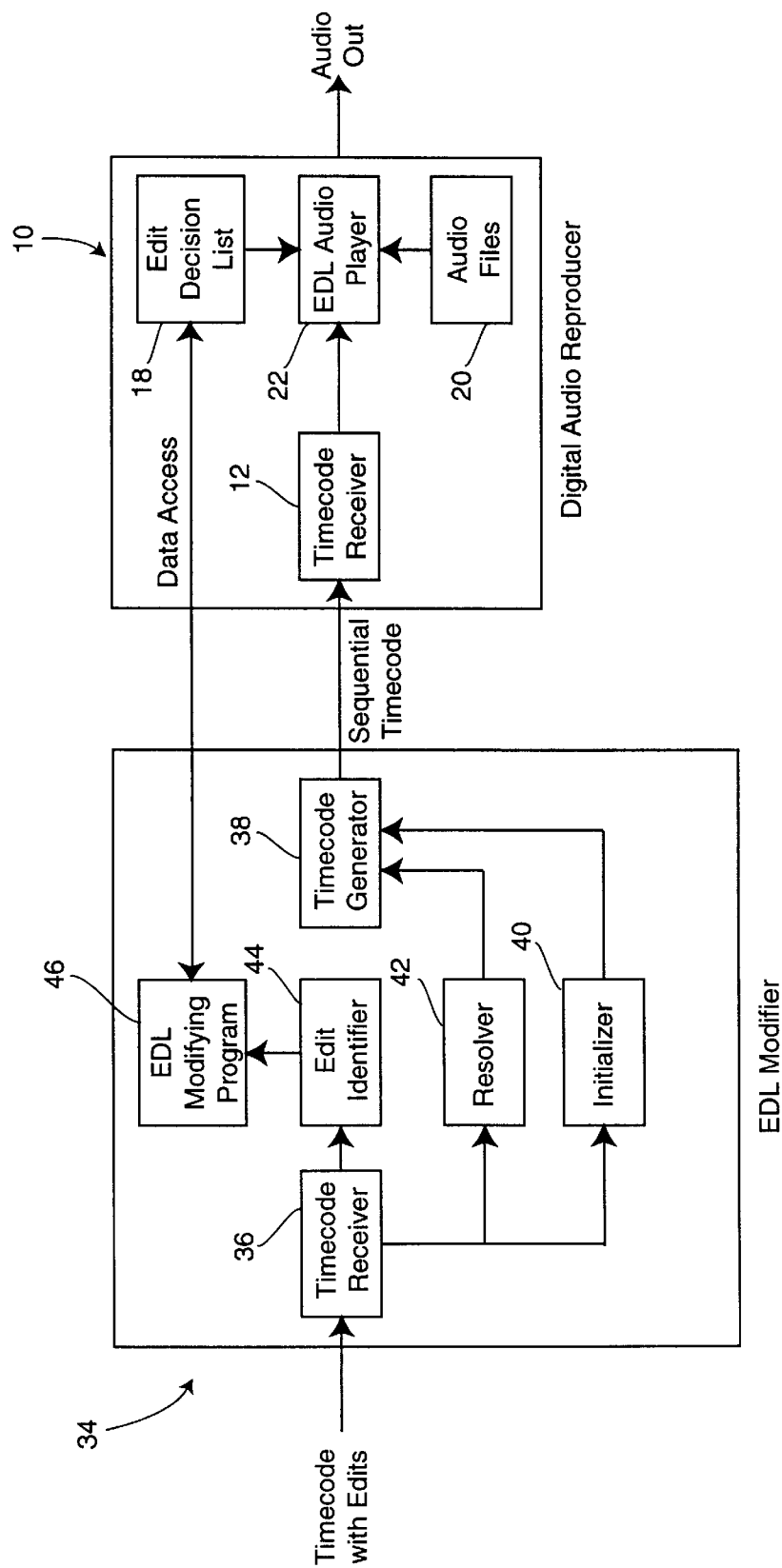
FIG. 2 is a functional block diagram illustrating components of an EDL modifier in accordance with the present invention and its interaction with an EDL player similar to FIG. 1.

In order to resolve the interruptions in audio output caused by discontinuities in the timecode, the present invention incorporates an EDL modifier 34 for use in conjunction with an EDL player 10, as shown in FIG. 2. The EDL player 10, for purposes of explanation, is shown having only the timecode receiver 12, audio files 20, edit decision list 18, and EDL audio player 22 although it is to be understood that the EDL player may include other components as described above.

A timecode receiver 36 of the EDL modifier 34 receives initial timecode potentially having edits or other discontinuities. The timecode receiver 36 intercepts the potentially discontinuous timecode that would have caused an unpredictable audio/video event in the EDL player 10. The timecode receiver 36 filters out dropouts and bit errors in the incoming timecode. The initial timecode is read and loaded into timecode generator 38 with a possible offset by initializer 40 to account for when the timecode is received and certain system delays, such as the distance from the timecode reader to the film projector gate (not shown). The speed of the timecode generator 38 is locked to the speed of the timecode receiver 36 by resolver 42 and generates sequential timecode from that point on. The resolver 42 prevents the timecode generator 38 from slipping relative to the timecode receiver input. The incoming timecode is self clocking data, typically two or more frequencies of biphase. The outgoing biphase is frequency locked to the incoming biphase. The phase relationship between of the timecode receiver 36 and the timecode generator 38 timecode frames, once established, is ignored.

Timecode receiver output is used by an edit identifier 44 to identify dropouts and bit errors caused by true edits and measure these discontinuities in the initial timecode. An EDL modifying program 46 compares these measured time discontinuities to the edit decision list 18 using a data access. If a corresponding discontinuity is found in the edit decision list 18, the edit decision list 18 is not altered. However, if no such edit decision list entry is found, one is created and added to the edit decision list 18. The new entry is inserted at a point far enough downstream in the edit decision list to permit normal operation of the EDL audio player 22. Thus, the edit decision list 18 is maintained to match any discontinuities detected.

Exemplary initial discontinuous timecode data received by the EDL modifier 34 is shown in FIG. 3. The timecode readings under the line indicate the timecode from the incoming segment and in this case starts at one hour, zero minutes, zero seconds (1:00:00:00) and ends at two hours, zero minutes and fifteen seconds (2:00:15:00), for purposes of explanation. The timecode readings above the horizontal line indicate the last timecode of the outgoing segment.

The first edit represents a reel change at one hour, ten seconds (01:00:10:00) and due to the reel change, the timecode shifts to two hours, zero minutes, zero seconds (02:00:00:00). This discontinuity would most likely already be incorporated into the edit decision list 18 as it is anticipated or known when the edit decision list 18 was originally created.

However, a second edit, for example a film splice within a reel, is shown to the right of the reel change edit. This second edit is found at two hours and ten seconds and lasts for one second (02:00:10:00 to 02:00:1 1:00). This edit is identified and measured by the edit identifier 44, analyzed and compared to the edit decision list 18 by the EDL modifying program 46, and due to the fact that the edit represents a film splice occurring after the creation of the edit decision list 18, would most likely not be found in the edit decision list 18. Thus, if the EDL player 10 were to experience this-timecode discontinuity in normal operation without the invention there would be a pause during the timecode interruption between the two hour and ten second timecode and the two hour and 11 second timecode, possibly creating a pop or other audio interrupt.

Referring now to FIG. 4, a portion of an exemplary edit decision list 18 which has been modified is shown. The edit decision list 18 includes the start timecode reading of one hour (01:00:00:00) and the duration of ten seconds (00:00:10:00) until the first edit. The reel change is shown at two hours (02:00:00:00). During the first pass of the initial discontinuous timecode, the EDL modifier 34 identifies the second film splice edit and discovering that this edit was not in the edit decision list 18, adds the edit to the list 18 so that the list now reads that there is a duration of ten seconds (00:00: 10:00) until the second edit at two hours, ten seconds (02:00: 10:00) and for a duration of one second to start at two hours and eleven seconds (02:00:11:00). The timecode then proceeds in normal fashion for the next four seconds (00:00:04:00) to the end at two hours fifteen seconds (02:00:15:00).

FIG. 5 illustrates the outgoing timecode from the EDL modifier 34 which is sent to the EDL player 10. As the edit decision list has been maintained and dropouts and errors corrected, the timecode is sequential after the first pass reading and represented without any edits or breaks for the entire twenty-four second time period (01:00:00:00 to 01:00:24:00).

Referring back to FIG. 2, the sequential timecode produced by the timecode generator 38 is fed to the timecode receiver 12 of the EDL player 10 and used to locate an initial position in the edit decision list 18 and open the selected segment of digital audio/video. The timecode generator 38 continues to produce sequential and continuous timecode which is a linear index into the edit decision list 18. The output of the EDL player 10 is an edited audio/video stream that corresponds to the edited timecode at the input of the EDL modifier 34.

Figure 6:
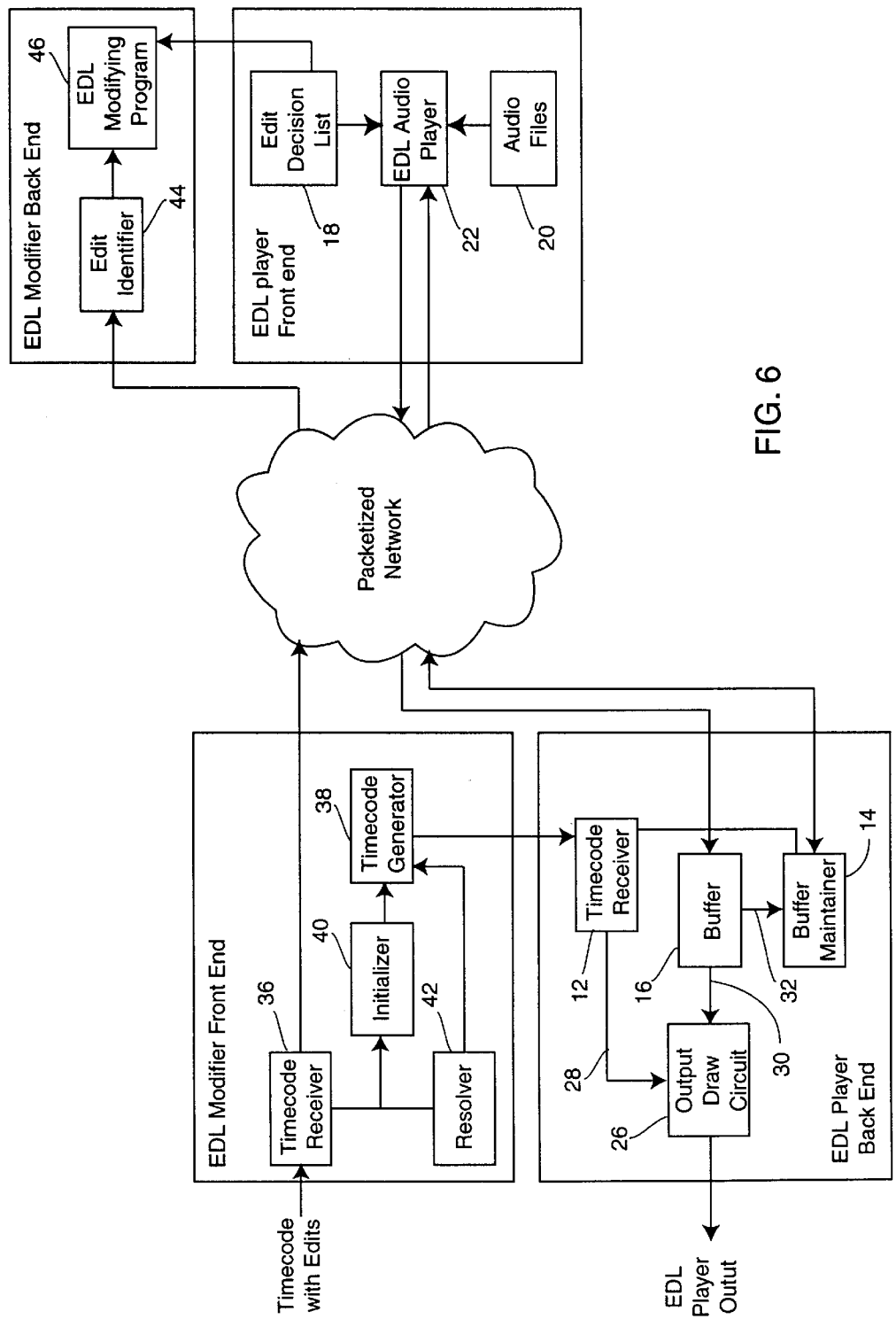
FIG. 6 is a functional block diagram of the EDL modifier and EDL player system in a network implementation.

FIG. 6 is a system block diagram of the invention having the same general components and generally functioning the same as that illustrated in FIG. 2, but in a network implementation. It will be noted that the EDL modifier 34 and EDL player 10 are split into two sections each, a front end and a back end, at each end of the network connection. Referring to the EDL modifier front end, timecode receiver 36 receives potentially discontinuous timecode having edits. On initial reception, timecode generator 38 is started with a potentially offset value. The resolver 42 locks the rate of the timecode generator 38 to the timecode receiver 36. Once the timecode generator 38 is started, it generates continuous timecode until the timecode receiver 36 ceases. Timecode receiver data is sent via packetized data through the network to the EDL modifier back end. Timecode generator output is sent to the EDL player back end.

Referring to the EDL modifier back end of FIG. 6, edit identifier 44 receives timecode data via the packetized network and identifies and measures timecode discontinuities. EDL modifying program 46 maintains the edit decision list 18 in the EDL front end to match the discontinuities as described above.

Referring to the EDL player back end of FIG. 6, in normal operation, timecode receiver 12 receives continuous timecode from a source, such as the film media. However, with the present invention, the timecode receiver 12 receives the timecode data from timecode generator 38. When the timecode is first received, buffer maintainer 14 requests, via the packetized data network, corresponding edit decision list 18 data and sequential timestamps to be delivered on packetized data to buffer 16. The data and timestamps are aligned to timecode receiver 12.

With reference to the EDL player front end of FIG. 6, the EDL audio player 22 receives the requests for the packetized data for EDL timestamps and data to be sent on the packetized network. In normal operation, the requests are for sequential data and timestamps. The requests are a linear index into the edit decision list 18. The edit decision list 18 indexes data from the audio files 20, which is timestamped and sent on packetized data through the network to buffer 16.

Referring back to the EDL player back end of FIG. 6, output draw circuit 26 is started and obtains output data clock 28 from timecode receiver 12 which derives the output data clock 28 from the rate of the incoming timecode. Synchronous EDL player data 30 is drawn from buffer 16 by output draw circuit 26. Timestamp data from buffer 32 is compared to timecode receiver data in order to start play of EDL data when buffers are initialized, or to stop playing EDL data when a discontinuity is found. The average depth of buffer 16 remains constant as the output data clock 28 and timecode data have identical rates. Also available on timestamp data 32 is the depth of information for the buffer 32. In the case of the timecode receiver dropouts, buffer depth is maintained to freewheel over the dropouts. When it is determined that the timecode has ceased, the buffer 32 is allowed to empty. The output is an edited audio/video stream free of pauses, clicks or pops that corresponds to the discontinuous timecode at the input to the EDL modifier timecode receiver 36.

Although several embodiments have been described in detail for purposes of illustration, various modifications may be made without departing from the scope and spirit of the invention. Accordingly, the invention is not to be limited, except as by the appended claims.

What is claimed is:

1. A method for maintaining edit decision lists for digital audio/video reproducers to maintain synchronization across timecode edits, comprising the steps of:

receiving a timecode;

detecting a discontinuity within the timecode;

searching for a corresponding time discontinuity in an edit decision list; and maintaining the edit decision list by creating and adding a timecode corresponding to the detected time discontinuity, if a corresponding time discontinuity is not found in the edit decision list.

2. The method of claim 1, including the step of locating an initial position in the edit decision list using the received timecode.

3. The method of claim 1, wherein the searching step includes the step of comparing the time discontinuity to the edit decision list.

4. The method of claim 1, including the step of detecting and correcting dropouts and errors in the timecode.

5. The method of claim 1, including the step of generating a sequential timecode.

6. The method of claim 5, including the step of opening a selected segment of digital audio/video using the sequential timecode.

7. The method of claim 5, wherein the sequential timecode incorporates corrected dropouts and errors of the received timecode.

8. The method of claim 5, wherein the sequential code incorporates the created corresponding time discontinuity timecode.

9. The method of claim 1, including the step of creating a continuous audio/video stream from the maintained edit decision list.

10. A method for maintaining edit decision lists for digital audio/video reproducers to maintain synchronization across timecode edits, comprising the steps of:

receiving a timecode;

detecting a discontinuity within the timecode;

searching for a corresponding time discontinuity in an edit decision list by comparing the detected time discontinuity to the edit decision list;

maintaining the edit decision list by creating and adding a timecode corresponding to the detected time discontinuity, if a corresponding time discontinuity is not found in the edit decision list;

generating a sequential timecode; and creating a continuous audio/video stream from maintained edit decision list.

11. The method of claim 10, including the step of locating an initial position in the edit decision list using the received timecode.

12. The method of claim 10, including the step of opening a selected segment of digital audio/video using the sequential timecode.

13. The method of claim 10, including the step of detecting and correcting dropouts and errors in the timecode.

14. The method of claim 13, wherein the sequential timecode incorporates corrected dropouts and errors of the received timecode.

15. The method of claim 10, wherein the sequential code incorporates the created corresponding time discontinuity timecode.

16. A system for maintaining edit decision lists for digital audio/video reproducers to maintain synchronization across timecode edits, comprising:

a potentially discontinuous position reference;

an edit decision list driven audio/video player;

means for generating a continuous position reference to drive the edit decision list driven audio/video player;

means for detecting and measuring the position reference discontinuities; and means for using said measurements to maintain the edit decision list such that audio/video output maintains proper synchronization and proper transitions between discontinuities.

17. The system of claim 16, wherein the position reference comprises timecode.

18. The system of claim 16, wherein the means for generating continuous position reference comprises a timecode generator which generates sequential timecode.

19. The system of claim 16, wherein the means for measuring the position reference discontinuities comprises an edit identifier.

20. The system of claim 16, wherein the means for maintaining the edit decision list comprises an edit decision list modifying program.

21. The system of claim 16, wherein the discontinuities are detected, measured and the edit decision list maintained with one pass in real time.

22. The system of claim 16, wherein the system is implemented into separate nodes of an asynchronous network.

* * * * *